US011587127B2

(12) United States Patent
Chanda et al.

(10) Patent No.: US 11,587,127 B2
(45) Date of Patent: Feb. 21, 2023

(54) METHOD AND SYSTEM FOR MANAGING CONTENT OF DIGITAL BRAND ASSETS ON THE INTERNET

(71) Applicant: Synqy Corporation, Pleasant Hill, CA (US)

(72) Inventors: Nikolaus Chanda, Concord, CA (US); Michael Weissman, Danville, CA (US); David Mosby, San Ramon, CA (US); John Hoye, Walnut Creek, CA (US)

(73) Assignee: SYNQY CORPORATION, Pleasant Hill, CA (US)

( * ) Notice: Subject to any disclaimer, the term of this patent is extended or adjusted under 35 U.S.C. 154(b) by 46 days.

(21) Appl. No.: 17/020,272

(22) Filed: Sep. 14, 2020

(65) Prior Publication Data

US 2021/0073870 A1    Mar. 11, 2021

Related U.S. Application Data

(63) Continuation of application No. 14/092,688, filed on Nov. 27, 2013, now Pat. No. 10,776,833.
(Continued)

(51) Int. Cl.
*G06Q 30/02* (2012.01)
*H04L 9/40* (2022.01)
(Continued)

(52) U.S. Cl.
CPC ..... *G06Q 30/0276* (2013.01); *G06Q 30/0241* (2013.01); *G06Q 30/0244* (2013.01);
(Continued)

(58) Field of Classification Search
CPC combination set(s) only.
See application file for complete search history.

(56) References Cited

U.S. PATENT DOCUMENTS 6,920,567 B1 *  7/2005  Doherty ............... G06F 21/105
                                                    713/168
6,938,170 B1    8/2005  Kraft et al.
(Continued)

FOREIGN PATENT DOCUMENTS

IN   1512/DEL/2004 A    8/2004
WO   WO-2005001656 A2 *  1/2005  ............ G06Q 30/02

OTHER PUBLICATIONS

Dong, Qin, "Search-Engine_Oriented Theme Crawler Design", Yancheng Institute of Technology, Yancheng, Jiangsu Province, China, International Conference on System Science, Engineering Design and Manufacturing Informatization, IEEE Computer Society, 2010, pp. 303-306., pp. 303-306.
(Continued)

*Primary Examiner* — Marie P Brady
(74) *Attorney, Agent, or Firm* — Perkins Coie LLP; Kristen Schunter

(57) ABSTRACT

A digital brand asset system is provided enabling a brand owner to create, distribute, maintain, manage, merchandise and analyze smart brand assets. The system enables distribution and sharing of smart brand assets across the websites. The websites can host webpages containing codes representing the smart brand assets. When a user device retrieves a webpage from one of the websites and renders the webpage, it executes the codes and requests the content of the smart brand assets from a brand asset server. Through the brand asset server, a brand owner can control the content and the presentation of the smart brand asset hosted by the websites. The system further enables the brand partners to adjust the content of the smart brand assets based on their needs.

12 Claims, 12 Drawing Sheets

Related U.S. Application Data

(60) Provisional application No. 61/730,421, filed on Nov. 27, 2012.

(51) Int. Cl.
 G06Q 30/0241 (2023.01)
 G06Q 30/0242 (2023.01)
 G06Q 30/0251 (2023.01)

(52) U.S. Cl.
 CPC ..... *G06Q 30/0254* (2013.01); *G06Q 30/0255* (2013.01); *G06Q 30/0277* (2013.01); *H04L 63/08* (2013.01); *H04L 63/12* (2013.01)

(56) References Cited

U.S. PATENT DOCUMENTS

| | | |
|---|---|---|
| 7,747,465 B2 | 6/2010 | Srinivasan et al. |
| 7,856,430 B1 | 12/2010 | Pollastro |
| 7,877,463 B2 | 1/2011 | Lentini et al. |
| 8,566,154 B2 | 10/2013 | Merriman et al. |
| 8,631,473 B2 | 1/2014 | Bhatia et al. |
| 8,694,610 B2 | 4/2014 | Jungck |
| 8,700,630 B2 | 4/2014 | Wexler et al. |
| 8,799,200 B2 | 8/2014 | Lahav |
| 8,856,869 B1 | 10/2014 | Brinskelle |
| 8,880,433 B2* | 11/2014 | Starr .............. H04L 9/083 705/67 |
| 9,106,607 B1 | 8/2015 | Lepeska et al. |
| 9,292,361 B1 | 3/2016 | Chitilian et al. |
| 9,305,098 B1 | 4/2016 | Willingham et al. |
| 9,912,718 B1 | 3/2018 | Lepeska et al. |
| 10,636,052 B2 | 4/2020 | Moran et al. |
| 10,679,259 B2 | 6/2020 | Chanda et al. |
| 2002/0046096 A1 | 4/2002 | Srinivasan et al. |
| 2002/0078136 A1 | 6/2002 | Brodsky et al. |
| 2002/0147637 A1 | 10/2002 | Kraft et al. |
| 2003/0046165 A1 | 3/2003 | Topel et al. |
| 2004/0093327 A1 | 5/2004 | Anderson et al. |
| 2004/0260767 A1 | 12/2004 | Kedem et al. |
| 2005/0050097 A1 | 3/2005 | Yeh et al. |
| 2005/0091111 A1 | 4/2005 | Green et al. |
| 2006/0236103 A1* | 10/2006 | Starr .............. H04L 9/32 713/168 |
| 2007/0050252 A1 | 3/2007 | Jain et al. |
| 2007/0101439 A1* | 5/2007 | Strauch .............. G06Q 10/10 726/28 |
| 2007/0239542 A1 | 10/2007 | Shapiro |
| 2007/0250468 A1 | 10/2007 | Pieper |
| 2008/0004960 A1 | 1/2008 | Coomer et al. |
| 2008/0077556 A1 | 3/2008 | Muriente |
| 2008/0086439 A1* | 4/2008 | Brough .............. G06Q 30/02 706/47 |
| 2008/0140626 A1 | 6/2008 | Wilson |
| 2008/0151315 A1 | 6/2008 | Flake et al. |
| 2008/0313031 A1 | 12/2008 | Li et al. |
| 2009/0006213 A1 | 1/2009 | Lerman et al. |
| 2009/0006214 A1 | 1/2009 | Lerman et al. |
| 2009/0012863 A1 | 1/2009 | Saephan |
| 2009/0037355 A1 | 2/2009 | Brave et al. |
| 2009/0070687 A1 | 3/2009 | Mazzaferri |
| 2009/0094137 A1 | 4/2009 | Toppenberg et al. |
| 2009/0119329 A1 | 5/2009 | Kwon et al. |
| 2009/0198662 A1 | 8/2009 | Prabhakar et al. |
| 2009/0327914 A1 | 12/2009 | Adar et al. |
| 2010/0030752 A1 | 2/2010 | Goldentouch |
| 2010/0100925 A1 | 4/2010 | Hinton |
| 2010/0180296 A1 | 7/2010 | Hendricks et al. |
| 2010/0332513 A1 | 12/2010 | Azar et al. |
| 2010/0332993 A1 | 12/2010 | Bousseton et al. |
| 2011/0071997 A1 | 3/2011 | Sullivan et al. |
| 2011/0082755 A1 | 4/2011 | Itzhak |
| 2011/0125587 A1 | 5/2011 | Netzer et al. |
| 2011/0161407 A1 | 6/2011 | Juda et al. |
| 2011/0161847 A1 | 6/2011 | Chaikin et al. |
| 2011/0208585 A1 | 8/2011 | Daboll et al. |
| 2011/0282860 A1 | 11/2011 | Baarman et al. |
| 2011/0283359 A1 | 11/2011 | Prince et al. |
| 2012/0011432 A1 | 1/2012 | Strutton |
| 2012/0016749 A1 | 1/2012 | Lisbakken |
| 2012/0022951 A1 | 1/2012 | Tolompoiko et al. |
| 2012/0072573 A1* | 3/2012 | Bladel .............. G06Q 30/00 709/224 |
| 2012/0095837 A1 | 4/2012 | Bharat et al. |
| 2012/0254149 A1 | 10/2012 | Ramsay |
| 2012/0259882 A1 | 10/2012 | Thakur et al. |
| 2012/0284252 A1 | 11/2012 | Drai et al. |
| 2012/0290399 A1 | 11/2012 | England et al. |
| 2013/0110637 A1 | 5/2013 | Bott |
| 2013/0166580 A1 | 6/2013 | Maharajh et al. |
| 2013/0287305 A1 | 10/2013 | Dhanda et al. |
| 2014/0032364 A1* | 1/2014 | Shepherd .......... G06Q 30/0609 705/26.35 |
| 2014/0075283 A1 | 3/2014 | Coursol et al. |
| 2014/0122255 A1 | 5/2014 | Snyder |
| 2014/0229271 A1 | 8/2014 | Clapp et al. |
| 2015/0213481 A1 | 7/2015 | Yuan |
| 2015/0254732 A1 | 9/2015 | Snyder |
| 2017/0116640 A1 | 4/2017 | Sah et al. |
| 2018/0218389 A1 | 8/2018 | Walker et al. |

OTHER PUBLICATIONS

Wang, Nan, "Design and Implementation of a Crawling System in Shopping Search Engine", School of Journalism and Communication, Tsinghua University, Beijing, China, Second International Workshop on Computer Science and Engineering, 2009, pp. 212-216., pp. 212-216.

Zhou, Jingyu, et al., "An Analysis of URLs Generated from JavaScript Code", IEEE/ACIS 11th International Conference on Computer and Information Science, 2021, pp. 688-693., pp. 688-693.

Portman, et al. "Brand Website Activity Impact Analysis: Do Page Views Drive Rx Outcomes?", Merkle. Pharmaceutical Management Science Association (PMSA). Sep. 15, 2011. (Year: 2011).

Neville, Kat, "How to Design Style Guides for Brands and Websites", Smashing Magazine, Jul. 21, 2010. (Year: 2010).

Vetro, Salvatore, "Observer Design Pattern Using JavaScript", Apr. 26, 2006.

Ajax Crawler, Paul Suganthan G C, 978-1-4673-2149-5/12/$31.009 © 2012 IEEE.

An Approach for Crawling Dynamic WebPages Based on Script Language Analysis, Yao et al., 2012 ninth Web Information Systems and Applications Conference, 978-0-7695-4819-7/12.

Embedding Semantic Annotations into Dynamic Web Contents, Navas-Delgado et al., Proceedings of the 15th International Workshop on Database and Expert Systems Applications (DEXA'04) 1529-4188/04.

USPTO, Notice of Allowance dated Feb. 22, 2022 for U.S. Appl. No. 16/862,081, 10 pages.

USPTO, Notice of Allowance dated Feb. 7, 2022 for U.S. Appl. No. 16/861,911, 15 pages.

Dong, Qin; "Search-Engine-Oriented Theme Crawler Design"; Yancheng Institute of Technology, Yancheng, Jiangsu Province, China, International Conference on System Science, Engineering Design and Manufacturing Informatization, IEEE Computer Society, 2010, pp. 303-306.

Wang, Nan; "Design and Implementation of a Crawling System in Shopping Search Engine"; School of Journalism and Communication, Tsinghua University, Beijing, China, Second International Workshop on Computer Science and Engineering, 2009, pp. 212-216.

Zhou, Jingyu, et al.; "An Analysis of URLs Generated from JavaScript Code"; IEEE/ACIS 11th International Conference on Computer and Information Science, 2021, pp. 688-693.

(56) References Cited

OTHER PUBLICATIONS

Shelly Ellis; "Interactive Advertising: Way Beyond Shooting Ducks", retrieved from https://marketingland.com/interactive-advertising-from-shooting-ducks-to-no22343; available on Sep. 24, 2012 (Years: 2012).

\* cited by examiner

| # | Displayed | Category Name | Move Up | Move Down | # Sub-Categories | # Products |
|---|---|---|---|---|---|---|
| 1 | ☑ | Air Conditioners And Heat Pumps | | ▼ | 2 | 0 |
| 2 | ☑ | Geothermal Heat Pumps | ▲ | ▼ | 0 | 6 |
| 3 | ☐ | Boilers | ▲ | ▼ | 0 | 4 |
| 4 | ☐ | Furnaces For Split Systems | ▲ | ▼ | 2 | 0 |
| 5 | ☑ | Air Quality Solutions | ▲ | ▼ | 5 | 0 |
| 6 | ☑ | Controls & Thermostats | ▲ | ▼ | 0 | 8 |
| 7 | ☑ | Fan And Evaporator Coils | ▲ | ▼ | 2 | 0 |
| 8 | ☑ | Ductless Split Systems | ▲ | ▼ | 5 | 0 |
| 9 | ☑ | Packaged Products | ▲ | | 4 | 0 |

*FIG. 8*

METHOD AND SYSTEM FOR MANAGING CONTENT OF DIGITAL BRAND ASSETS ON THE INTERNET

CROSS-REFERENCE TO RELATED APPLICATION(S)

This claims priority to provisional U.S. Patent Application Ser. No. 61/730,421, filed Nov. 27, 2012, the entirety of which is incorporated herein by this reference thereto.

TECHNICAL FIELD

The invention relates to promoting and using brand assets online. More particularly, the invention concerns a framework for brand owners and website owners to control the way of distributing and maintaining brand assets being presented on the Internet.

BACKGROUND

The Internet is a useful platform for brand owners to promote their brands using various brand assets. The brand assets can include images, videos, presentations, brochures (e.g., PDF or other formats), flash animations, software applications, widgets or other types of media related to the brands. Often, these brand assets are defined by rules as to how they are to be used. These rules are called brand guidelines. When brand owners use their brand assets, they have controls of how the brand assets are used and applied according to the brand guidelines.

In order to extend a brand's reach to a wider audience, a brand owner shares the brand assets with consumers, reseller partners, media, trade associations and other interested third parties for use on websites that are not managed or maintained by the brand owner.

Presently, the method for distributing and maintaining brand assets when they are shared with third parties is manual and disparate. FIG. 1 is a flow diagram showing the legacy process of distributing and managing brand assets. Once a brand asset has been created in step 101, the brand owner distributes the brand asset to its third party user via email (in step 102) or via an extranet (e.g., a website in step 104 and 106). Ultimately, the recipient of the brand asset uploads the asset into a website system and links the asset in code (e.g., HyperText Markup Language, "HTML") to the location of the file on the system in step 112. However, previous to publishing the brand asset, the recipient of the brand asset manipulates the brand asset to fit the website that is going to host the asset in step 110. Often, that manipulation violates the brand guidelines, which can potentially harm the equity of the brand. Such manipulation can include stretching images, placing them in places not approved by the brand owners, etc.

Due to the nature of the Internet, users of brand assets can source these assets by copying them from websites other than the brand owner's, in step 108. As a result, these users may use the brand assets that do not conform to the brand guidelines.

Brand assets often change since they represent products, which often receive updates or new models. As a result, brand assets can become out of date quickly. When a person sources an out-of-date brand asset and puts that asset on another website, the incorrect brand information is propagated throughout the Internet, which again harms the brand's equity. Maintaining the currency and correctness of brand assets on websites that are not managed by brand owners is a challenging task, because these brand owners lack visibility to where those brand assets exist on the Internet and lack the ability to remotely update and/or manage those brand assets.

When a brand owner wishes to promote its business on its own website, often multiple brand assets are presented together. For example, a product photograph may be marketed adjacent to a set of specifications, a brochure, a video or some other form of information about the brand and its products or services. This is often called merchandising. When a brand owner controls the website, it is easy for that owner to merchandise these brand assets in a consistent, attractive manner. However, when a brand owner wishes to promote its business on another company's website that is not owned or controlled by the brand owner, it is very difficult to consistently deliver brand assets that are well merchandised together, especially not within a specific, packaged area.

Brands are also used to apply credibility to the users of the brands. For example, a medical board certification or accreditation logo can increase the perceived value of the doctor who has such a certification. There is an association between the beneficiary of such accreditation (e.g. the doctor) and the website that represents that doctor. Today, the brand asset is simply an image file representing the brand logo for that certification and there is no authentication that the brand user is authorized to use the brand and there is no association between the website using the brand asset, the website owner authorized to use the brand asset and the company making the authorization.

Finally, brand owners have limited visibility regarding where these brand assets are used online, who is using those assets, how many people are viewing or interacting with those assets and under what condition those brand assets appear. This impacts the ability for brand owners to control those brand assets, value the brand assets, and evaluate the return on investment from the use of those brand assets.

SUMMARY

A digital brand asset system allows a brand owner to create, distribute, maintain, manage, merchandise and analyze smart brand assets. The system enables the brand owner to better merchandise brands and products online, ensures brand consistency and currency, enforces compliance with brand guidelines, and delivers brand engagement across third-party controlled websites.

The system enables distribution and sharing of smart brand asset across the websites. The websites can host webpages containing codes representing the smart brand assets. When a user device retrieves a webpage from a website and renders the webpage, it executes the code and requests the content of the smart brand assets from a brand asset server. Through the brand asset server, a brand owner can control the content and the presentation of the smart brand asset hosted by the websites.

A smart brand asset is an interactive container of brand assets such as images, videos, interactive software code, product brochures, embed codes from other websites, and other items. A smart brand asset is represented by a unique embed code which is provided by the System. This embed code is placed on web pages, e.g. in lieu of an image reference, to represent the smart brand asset. When a web page containing a smart brand asset embed code is rendered, a computer script gets called to load the initial payload of the smart brand asset into a web browser. This payload is typically an image but can also be a piece of text, video or other brand asset object. Depending on how the smart brand asset is configured, the smart brand asset may launch a secondary payload of digital brand assets when the consumer interacts with the smart brand asset. These secondary assets can be displayed, for example in a lightbox or within the same page and location as the initial payload. A smart brand asset can include a single brand asset (i.e. the initial payload), or include multiple brand assets in multiple slides.

The brand asset server can control the content and presentation of the smart brand asset hosted on websites based on various factors. For instance, the factors can include, previous click through rates, aggregated shopper behaviors, geographical locations of the websites or website visitors, categorized types of websites, blacklist of websites.

The brand owner may further grant certain rights to brand partners. The brand asset server can determine the relationship between the identity of the brand partner and how the smart brand asset is being presented. For instance, after authentication, the brand asset server can enable the brand partner to add or remove the content of the smart brand asset, or to select the initial payload being presented first within the smart brand asset. The brand asset server can further assign groupings of smart brand assets that carry different content for different groups of brand partners.

BRIEF DESCRIPTION OF THE DRAWINGS

FIG. 8 is a sample screenshot of a content filtering interface for a smart brand asset.

DETAILED DESCRIPTION

Figure 1:
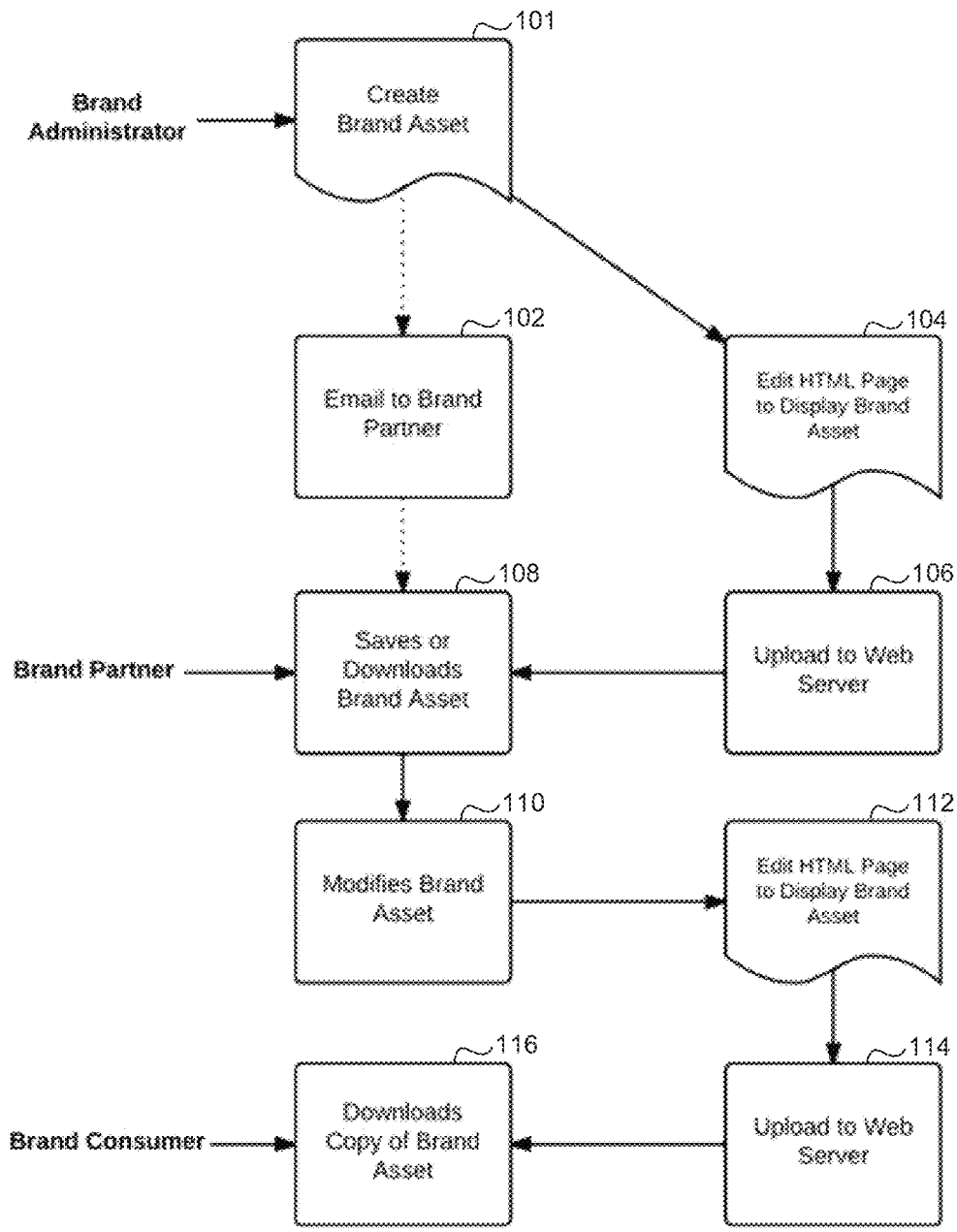
FIG. 1 is a flow diagram showing a legacy process of distributing and managing brand assets.

The nature, objectives, and advantages of the invention will become more apparent to those skilled in the art after considering the following detailed description in connection with the accompanying drawings.

Definitions

Terms used in the claims and specification are to be construed in accordance with their usual meaning as understood by one skilled in the art except and as defined as set forth below.

Brand Asset: A digital representation of a brand or a product identified by the brand. For example, a brand asset can include product hero shot, product brochure, textual content, image logo, video, training materials, etc.

smart brand asset: An interactive container of brand assets. A smart brand asset ("SBA") is represented by an embed code including references to images, videos, interactive software code, product brochures, embed codes from other websites, and other items that can be placed on a website and accessed by a browser when deployed on a website. The smart brand asset is capable of delivering a controlled presentation of the brand assets determined by the brand owner.

Slide: A collection of digital content merchandised together. A slide typically includes one or more brand assets and/or other objects such as buttons or menus for web browsing navigation.

Payload: A collection of slides or a single slide.

Initial Payload: The slide that would be displayed when the smart brand asset first loads on a web page.

Secondary Payload: The Slide or Slides that would be displayed, e.g. in a lightbox, when a user interacts with the smart brand asset, e.g. by moving the mouse icon over or clicking on the smart brand asset.

Lightbox: An overlay showing objects that is displayed on top of a current web page. When the overlay is displayed, the rest of the web page content may be darkened.

System: A computer system as a whole that is used to create, configure, administer, and deliver payloads of smart brand assets.

Brand Owner: An individual or entity, or a representative of the individual or entity, who creates and publishes the smart brand assets and may be the owner of a given brand asset. The brand owner can be also responsible for creating other users of the system.

Brand Partner: An individual or entity who is a representative of a company that is a business partner to the brand owner. For example, a brand partner can be a distributor or a reseller. A brand partner can set filters on what will show up on their website or, on occasion what an anonymous administrator's web site will display (e.g. setting filters of which products a particular reseller can display on their site) and configure applications as well as site configurations.

Anonymous Administrator: An individual or entity who is an owner and/or administrator of a website that contains a smart brand asset but does not have the brand partner authorization (as assigned by the brand owner) to configure a given smart brand asset. Examples of anonymous administrators can be blog owners, publishers that publish articles containing a smart brand asset, resellers or dealers of a product that are known by the brand partner (e.g. a distributor) but do not necessarily have a business relationship with the brand owner. An anonymous administrator can configure certain aspects of the smart brand asset for their website only.

Site Owner: An individual or entity who has administrative responsibilities for updating websites that contain a smart brand asset. A site owner can be, e.g. a brand partner or anonymous administrator.

Consumer: A viewer of a smart brand asset presented on a web page. A consumer has no administration capability but may share the smart brand asset with other consumers if the smart brand asset is configured to be shareable.

Environment of Smart Brand Asset System

Figure 2:
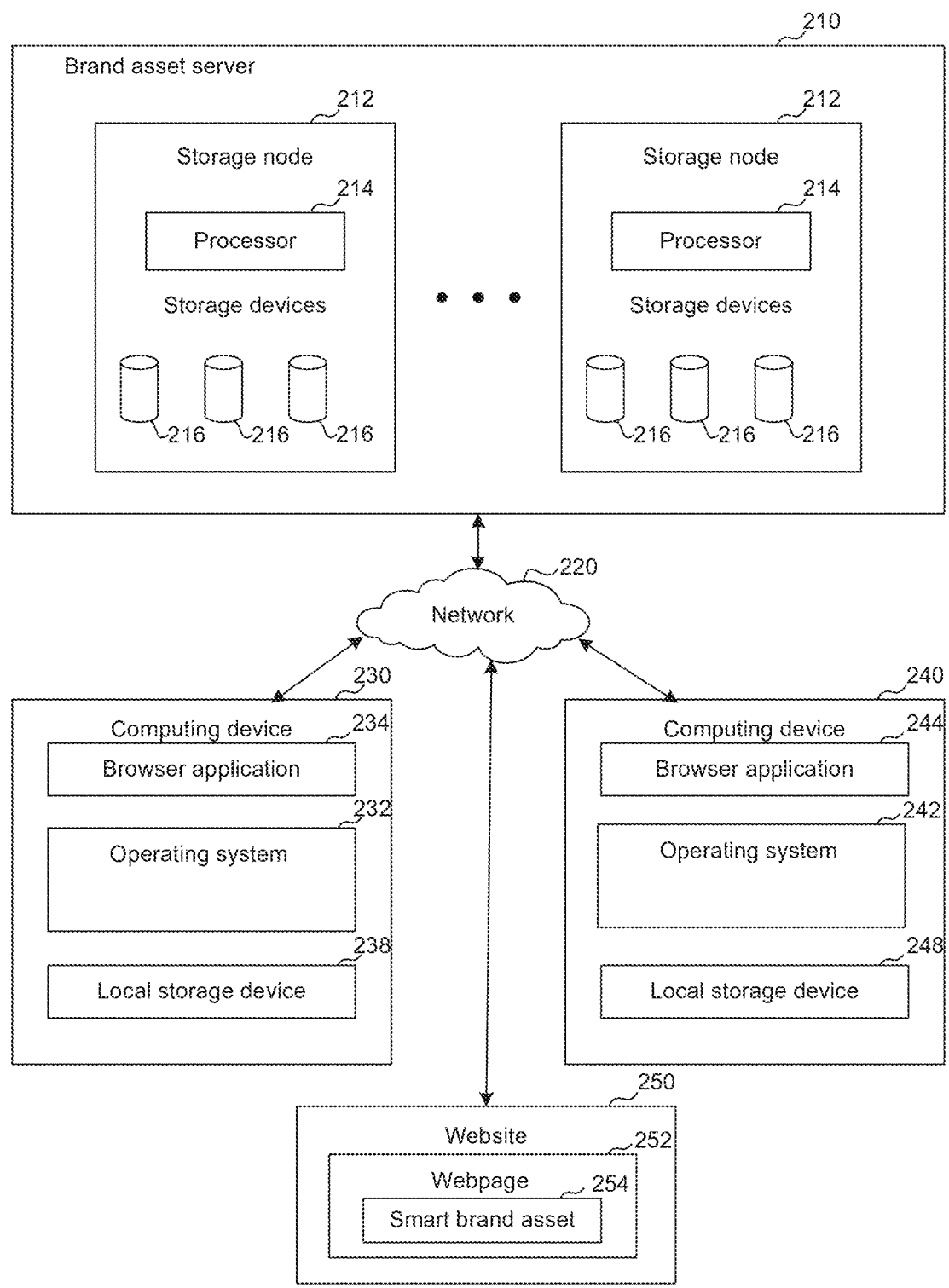
FIG. 2 is a block diagram of the components and interconnections of a smart brand asset system, according to an embodiment of the invention.

FIG. 2 is a block diagram of the components and interconnections of a smart brand asset system, according to an embodiment of the invention. The brand asset server 210 is responsible for creating, configuring, administering, and delivering payloads of smart brand assets. The brand asset server 210 is configured to communicate with the computing devices. In one embodiment, the brand asset server 210 can be a server cluster having computer nodes interconnected with each other by a network. The cloud server 210 can contain storage nodes 212. Each of the storage nodes 212 contains one or more processors 214 and storage devices 216. The storage devices can include optical disk storage, RAM, ROM, EEPROM, flash memory, phase change memory, magnetic cassettes, magnetic tapes, magnetic disk storage or any other computer storage medium which can be used to store the desired information.

The computing devices 230 and 240 can each communicate with the brand asset server 210 and a website 250 via network 220. The network 120 can be, e.g., the Internet. The website 250 can be owned by the brand owner or other entities that are not controlled by the brand owner. The website 250 hosts a webpage 252 which contain a code representing a smart brand asset 254. Although FIG. 2 illustrates two computing devices 230 and 240, a person having ordinary skill in the art will readily understand that the technology disclosed herein can be applied to a single computing device or more than two computing devices connected to the brand asset server 210 and website 250.

The computing device 230 includes an operating system 232 to manage the hardware resources of the computing device 230 and provides services for running browser application 234. The browser application 234 stored in the computing device 230 require the operating system 232 to properly run on the device 230. The computing device 230 includes at least one local storage device 238 to store the computer applications and user data. The computing device 230 or 240 can be a desktop computer, a laptop computer, a tablet computer, an automobile computer, a game console, a smart phone, a personal digital assistant, smart TV, set top box, DVR, Blu-Ray, residential gateway, over-the-top Internet video streamer, or other computing devices capable of running computer applications, as contemplated by a person having ordinary skill in the art.

The browser application 234 downloads the webpage 252 from the website 250. To render the webpage 252, the browser application 234 executes the code contained in the webpage 252, including the code representing the smart brand asset 254. Following the instructions of the code, the computing device 230 requests the content of the smart brand asset 254 from the brand asset server 210. The brand asset server can dynamically determine the content and the presentation of the smart brand asset 254, and deliver them to the computing device 230.

Figure 3:
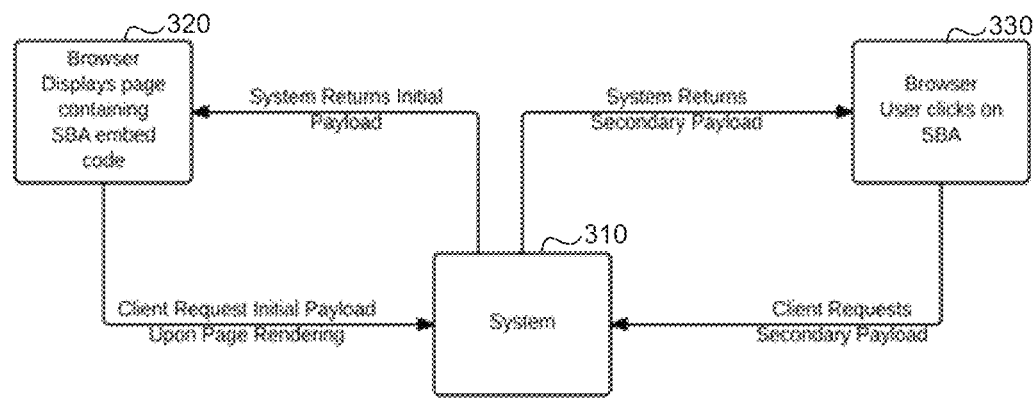
FIG. 3 is a block diagram of showing the interaction among the smart brand asset system and browser applications for displaying the smart brand asset, according to an embodiment of the invention.

FIG. 3 is a block diagram of showing the interaction among the smart brand asset system and browser applications for displaying the smart brand asset, according to an embodiment of the invention. A browser application 320 running a computing device loads and displays a webpage containing an SBA embed code. Upon rendering the webpage, the browser application 320 requests an initial payload of the smart brand asset from the system 310. In response, the system 310 returns an initial payload of the smart brand asset to the browser application 320.

The system 310 can further send secondary payloads of smart brand assets to computing devices running browser applications. For example, a browser application 330 showing the initial payload of the smart brand asset can receive a signal from its computing device indicating that the user of the device clicks on the smart brand asset. Accordingly, the browser application 330 request second payload of the smart brand asset from the system 310. In response, the system 310 can return the secondary payload to the browser application 330.

Figure 4:
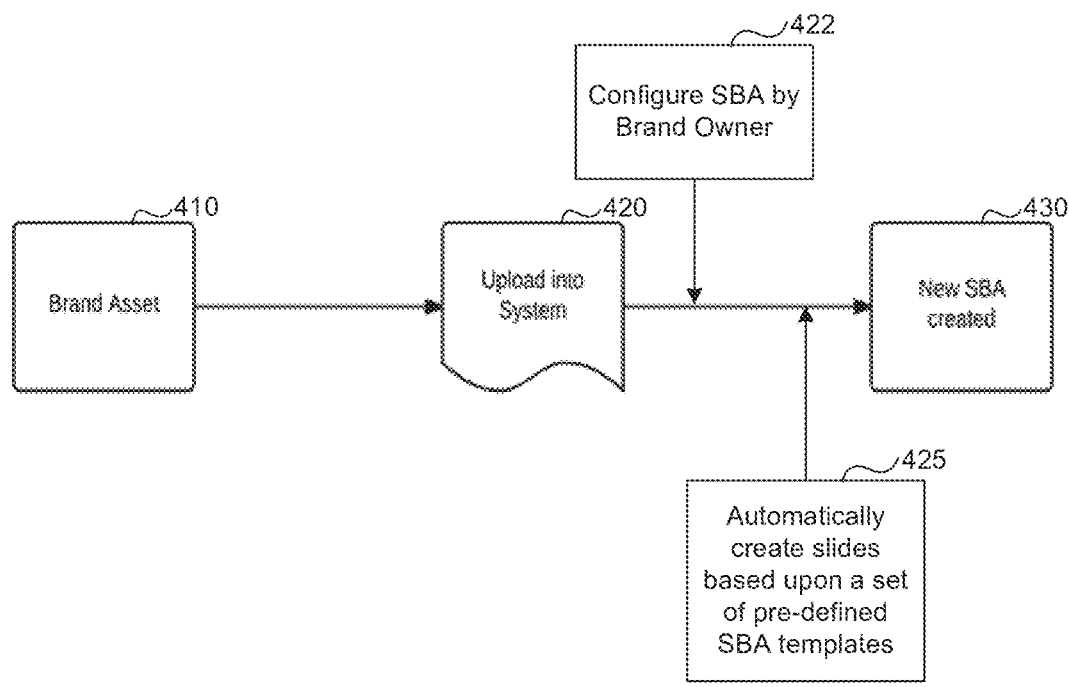
FIG. 4 is an example flow diagram showing creation of a smart brand asset, according to an embodiment of the invention.

FIG. 4 is an example flow diagram showing creation of a smart brand asset, according to an embodiment of the invention. A brand owner can create a smart brand asset by dragging and dropping one or more brand asset into a pre-defined area of a webpage and loading the brand asset into the system. The brand owner can further define the contents and order of the slides in the smart brand asset.

For example, in step 410, the brand owner can drag a file containing a brand asset from their computer desktop or a browser onto a smart brand asset creation pallet, which is a defined area of a webpage. In step 420, the system then uploads the file into the system. In step 430, the system establishes an identification code number for the asset, creates a smart brand asset, and displays it in a smart brand asset editor. The smart brand asset is now ready for review. The brand owner may then choose to publish the smart brand asset by clicking a "Publish" button and the System will create a unique embed code for that smart brand asset and registers the smart brand asset as a published smart brand asset within the system.

In addition, the brand owner can further create the content of the smart brand asset by using the templates provided by the System. Through the proprietary templates, the brand owner can create multiple payload variants for a smart brand asset. As FIG. 4 shows, the brand owner can simply load the selected brand assets into the System in step 420. Optionally the brand owner can further configure the smart brand asset to optimize the payload in step 422. The System in step 425 can automatically create multiple variants of slides based upon a set of pre-defined templates from each group of brand assets and organize the slides into a queue, in order to achieve the best return rate of investment.

Instead of pre-defining the potential choices of variants and manually crafting these variants in HTML by the brand owner or its representative, the System dynamically creates the payload variants automatically. This saves design and prioritization time and delivers a set of variants that are a factorial of the number of assets combinations.

During the process illustrated in FIG. 4, no coding or graphic design skills are required to create a sharable smart brand asset. The process eliminates all unnecessary steps needed for smart brand asset creation from any brand asset. It also applies drag and drop capabilities typically limited to computer-hosted applications to a web-hosted application.

Figure 5:
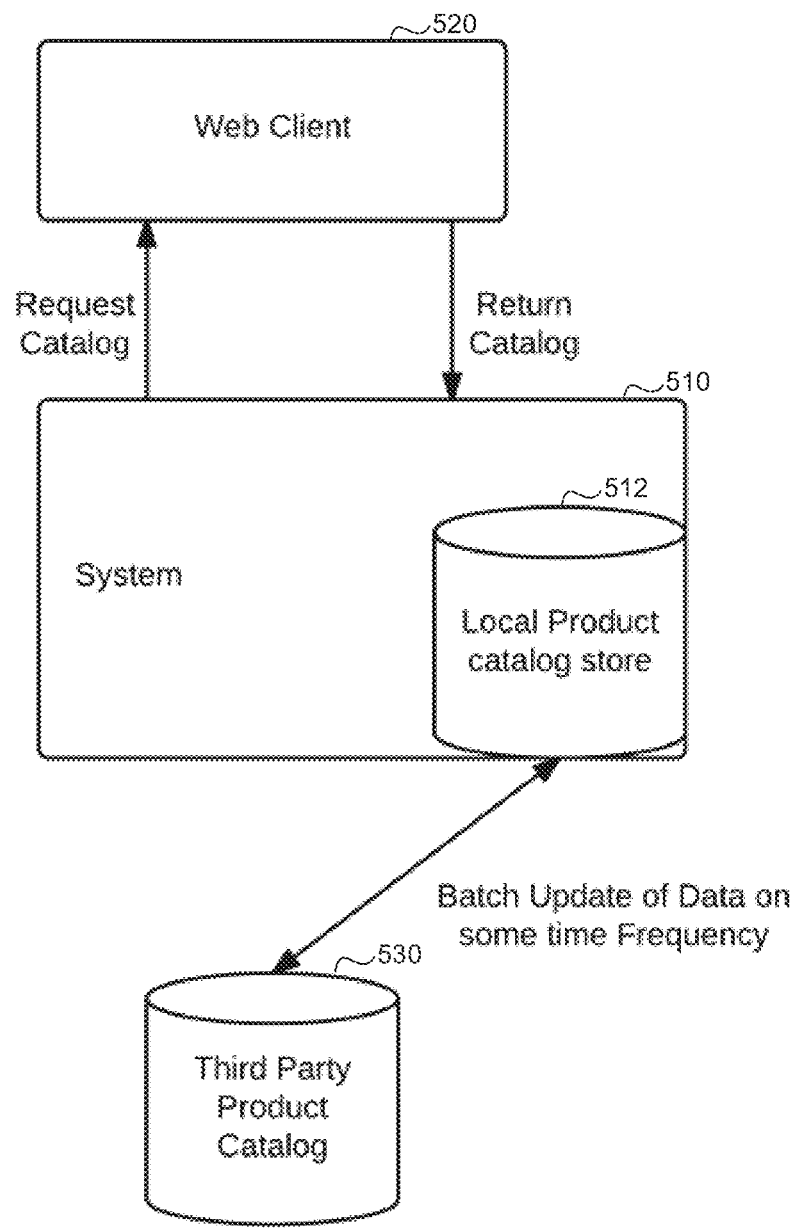
FIG. 5 is a block diagram of showing a smart brand asset system that is database driven, according to an embodiment of the invention.

FIG. 5 is a block diagram of showing a smart brand asset system that is database driven, according to an embodiment of the invention. A brand owner may want to show his entire product offering (or a subset of the offering) where the brand appears, so that the brand always carries an up to date catalog of products to potential buyers. This is particularly relevant when a reseller doesn't want to designate a whole web page to a vendor's product selection and wants the product catalogue to appear from within a single object such as a logo or product photograph.

For example, a single smart brand asset may be created for a given product catalog containing an initial payload and a second payload. The content of the secondary payload is store in a product catalog database 512 of the system 510. When a user clicks on the smart brand asset, the product catalog will be displayed in a lightbox. The database 512 (also referred to as product catalog store) includes rich-media data elements of the secondary payload for the smart brand asset. When a web client 520 tries to load the secondary payload of the smart brand asset, it requests the data elements (also referred to as catalog) from the system 510. The system 510 reads the data elements from the database 512 and returns them to the web client 520. The web client can present the data elements in a layout pre-defined by the embed code of the smart brand asset. The data elements may be clickable, leading to more specific information about a given clicked area.

There may be a third party product catalog database 530 to supply third party data elements. For example, a smart brand asset may include some data elements created by a third party. The local catalog database 512 can synchronize with the third party product catalog database 530 to update the third party data elements in batches.

Recommendation Engine of Smart Brand Asset Based on Historical Data

Figure 6:
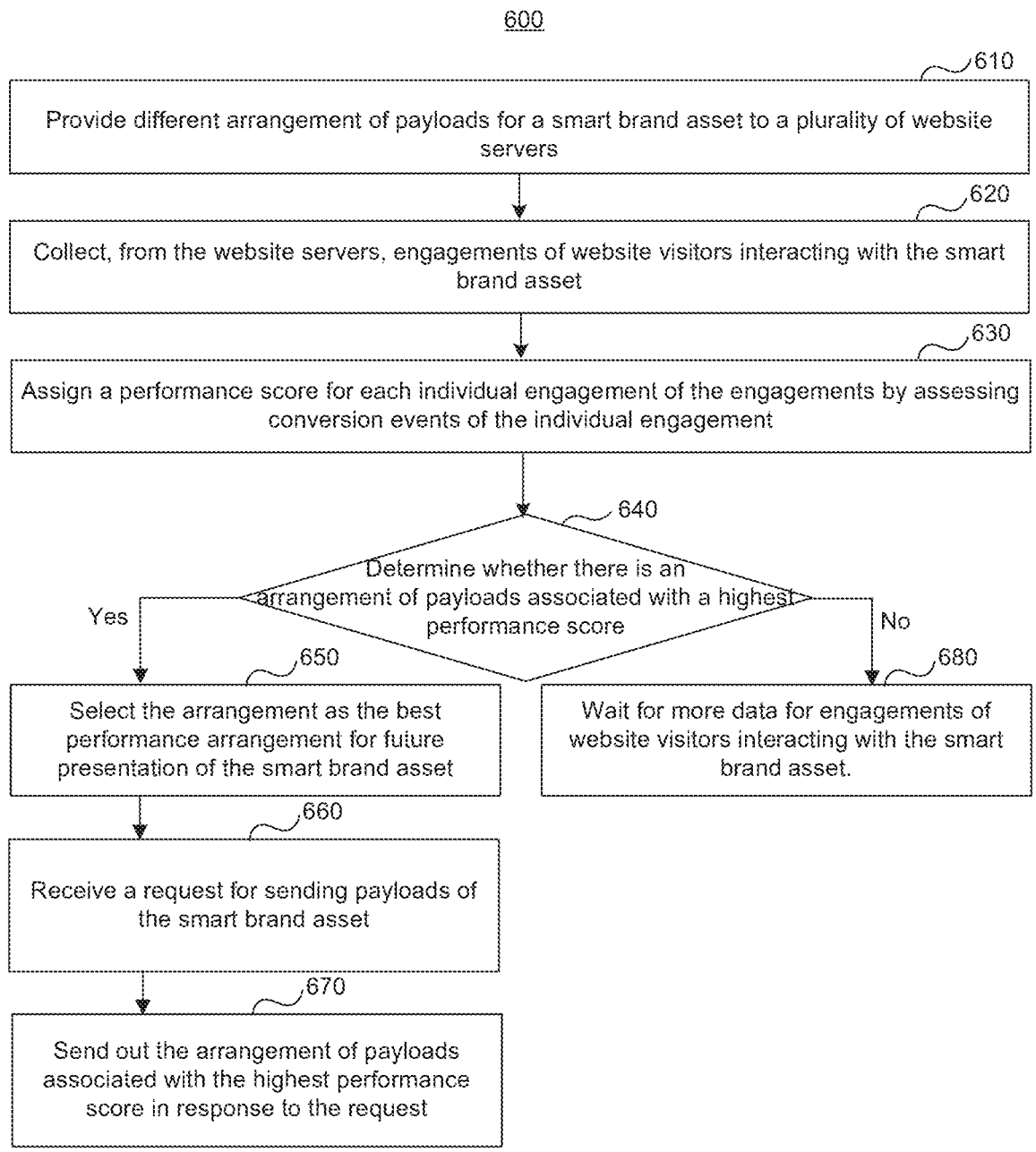
FIG. 6 is an example flow diagram showing a mechanism of a recommendation engine to adjust content appearing within a smart brand asset based on previous user behavior characteristics, according to an embodiment of the invention.

A smart brand asset system can control in real time the content and the presentation of a smart brand asset hosted by a website based on various factors. For example, the smart brand asset system can reorder the content appearing within a smart brand asset based upon previous user behavior characteristics. FIG. 6 is an example flow diagram showing a mechanism of a recommendation engine to adjust content appearing within a smart brand asset based on previous user behavior characteristics, according to an embodiment of the invention. The content adjusting can include, for example, reordering content (e.g., reordering slides or payloads of the smart brand asset), changing content of the smart brand asset, changing page layout of the smart brand asset, or changing product offers.

A brand owner wants his resellers to merchandise his products in a quick and efficient way. To improve overall sales and profitability, the websites of the resellers need to present the smart brand assets with a high conversion rate. The recommendation engine is to help the brand owners who are delivering product feeds to optimize their product catalog presentation to ensure website visitors are presented in the most profitable layout possible. Typically the user behavior across the websites in an dealer network are consistent and can be collected across the entire network of resellers to model shopping/behavior patterns having statistical significances. The recommendation engine determines the feeds for the smart brand asset based on the user behavior patterns.

The recommendation engine collects the data of website visitors interacting with the smart brand asset across the websites hosting the smart brand asset. When a website visitor visits a webpage containing a smart brand asset, the code representing the smart brand asset captures the visitors' interaction with the smart brand asset and sends the data to a brand asset server running the recommendation engine. The recommendation engine aggregates all the information across the websites and determines the arrangement of payloads of the smart brand asset having the best performance across the dealer network. Based upon this data, the System can make recommended changes to content or layout based upon the aggregated behavior of all shoppers.

In step 610, a recommendation engine provides different arrangement of payloads for a smart brand asset to a plurality of website servers. The website server hosts webpages including codes representing the smart brand asset and presenting the different arrangements of payloads. The recommendation engine can be implemented, for example, as a module running at a brand asset server owned by the brand owner.

In step 620, the recommendation engine collects, from the website servers, engagements of website visitors interacting with the smart brand asset. In step 630, the recommendation engine assigns a performance score for each individual engagement of the engagements by assessing conversion events of the individual engagement. An engagement may involve multiple different conversion events. For example, an engagement may include conversion events such as click through rates, mouse hover times, play lengths, number of tabs used, clicking a social engagement button, usage of online chat, commenting or reviewing an offering, or filling out a form within the smart brand asset.

In step 640, the recommendation engine determines whether there is an arrangement of payloads associated with a highest performance score. The arrangement with a highest performance score may be an existing arrangement tested by the previous user interactions, or an arrangement predicted by the analysis. In other words, the arrangement with a highest performance score may be selected among the existing arrangements based on the performance scores, or may be predicted as a new arrangement. If there is no arrangement of payloads determined with a highest performance score, in step 680, the recommendation engine may choose to wait for more data for engagements of website visitors interacting with the smart brand asset.

If there is an arrangement of payloads determined with a highest performance score, in step 650, the recommendation engine selects the arrangement as the best performance arrangement for future presentation of the smart brand asset. In step 660, the recommendation engine receives a request for sending payloads of the smart brand asset. In step 670, the recommendation engine sends out the arrangement of payloads associated with the highest performance score in response to the request.

Partner Verification and Payload Adjusting

The smart brand asset system can deliver a different payload based upon the attributes of the owner of a website the smart brand asset sits on. The brand owner may prefer that the content of a smart brand asset only show up on websites owned by entities authorized by the brand owner. For instance, a brand owner wants to confirm that the owner of a website is an actual affiliate business partner before delivering content of the smart brand asset to the website.

When a website owner wants to use a smart brand asset and add it to its website, the owner entity needs to authenticate itself. The brand asset server may provide a user interface for the authentication (e.g. a web interface). The first time the entity (or its representative) clicks on the smart brand asset on the interface, it is presented with a form requesting identifying information (e.g. unique certification #, account ID and password) related to the entity. The system confirms that the user is a user in good standing. The System creates an association between an identification of the smart brand asset, the website location for hosting the smart brand asset and the account number from the entity. The brand asset server then can provide the content payload of the smart brand asset for that user. For example, that payload can be a certifying logo and/or specific information regarding that particular membership of the entity.

Figure 7:
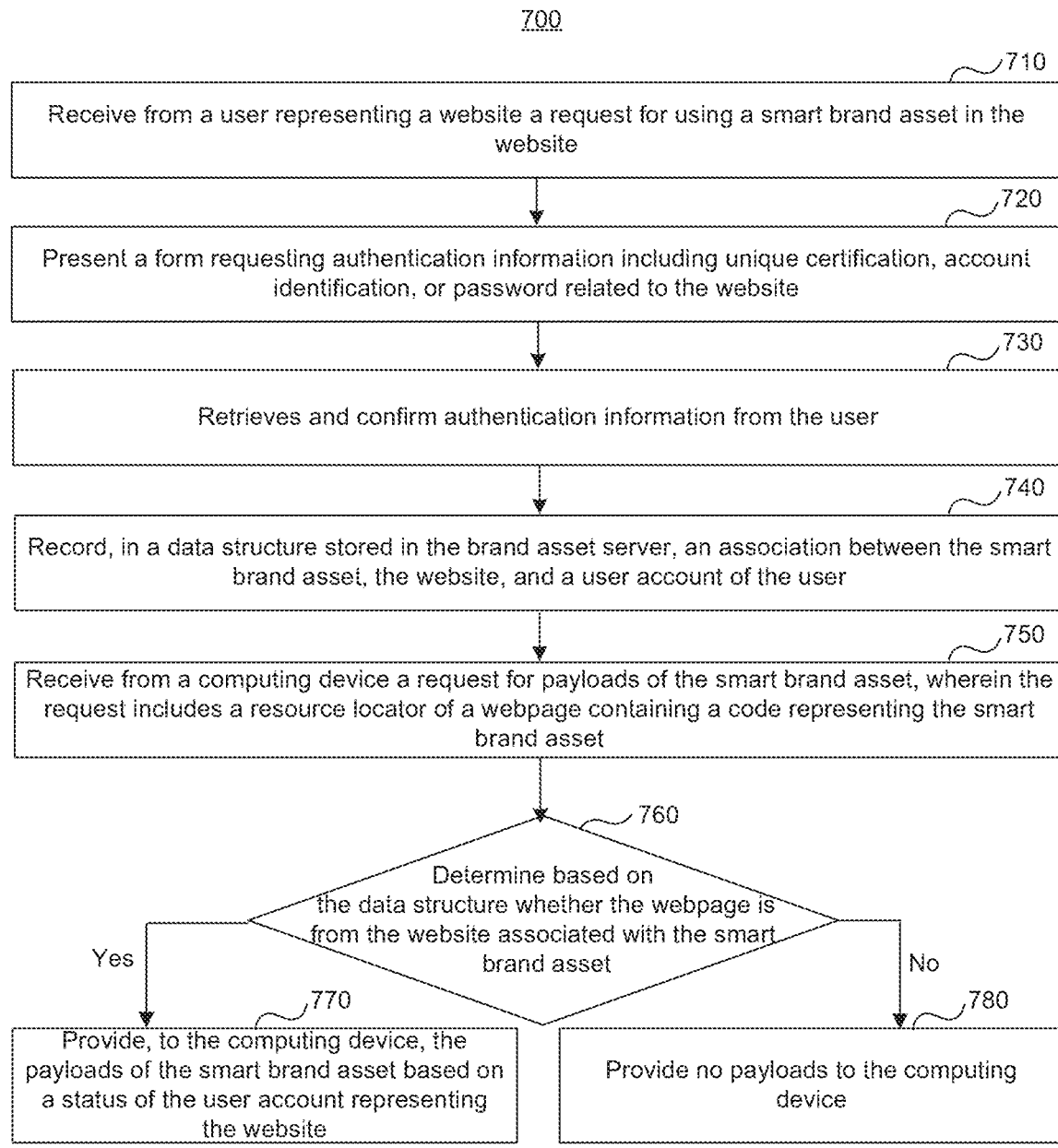
FIG. 7 is an example flow diagram showing a mechanism of authorizing usage of smart brand assets, according to an embodiment of the invention.

FIG. 7 is an example flow diagram showing a mechanism of authorizing usage of smart brand assets, according to an embodiment of the invention. In step 710, the brand asset server receives from a user representing a website a request for using a smart brand asset in the website. The website may belong to a business partner affiliate to a brand owner of the smart brand asset. The payloads of the smart brand asset may be determined by the brand asset server based on a business relationship between the business partner and the brand owner.

In step 720, the brand asset server presents a form requesting authentication information including unique certification, account identification, or password related to the website. In step 730, the brand asset server retrieves and confirms authentication information from the user. In step 740, the brand asset server records, in a data structure stored in the brand asset server, an association between the smart brand asset, the website, and a user account of the user.

In step 750, the brand asset server receives from a computing device a request for payloads of the smart brand asset, wherein the request includes a resource locator of a webpage containing a code representing the smart brand asset. In step 760, the brand asset server determines based on the data structure whether the webpage is from the website associated with the smart brand asset. If the webpage is from the website associated with the smart brand asset, in step 770, the brand asset server provides, to the computing device, the payloads of the smart brand asset based on a status of the user account representing the website. If the webpage is not from the website associated with the smart brand asset, in step 780, the brand asset server provides no payloads to the computing device.

Filtering and Adjusting Payloads by the Brand Partners

A brand partner wants to filter the content of the smart brand asset (e.g. product catalog) to only present the content relevant to the brand partner (e.g. products the brand partner plans to sell). A brand partner may first login to the system to identify that he or she has the ability to filter the database-driven payload of a smart brand asset. The brand partner will then be presented with an interface showing all content of the smart brand asset (e.g. products in the feed). The brand partner will then identify which content (e.g. products) will and will not show on the user's website by turning on or turning off the specific product within the feed. FIG. 8 is a sample screenshot of a content filtering interface for a smart brand asset. The brand partner can use this feature to filter the product feed to remove or add products so that only the products they carry will be displayed on their website. The brand partner can also use similar interface for select the initial payload to be displayed first in the smart brand asset.

Figure 9:
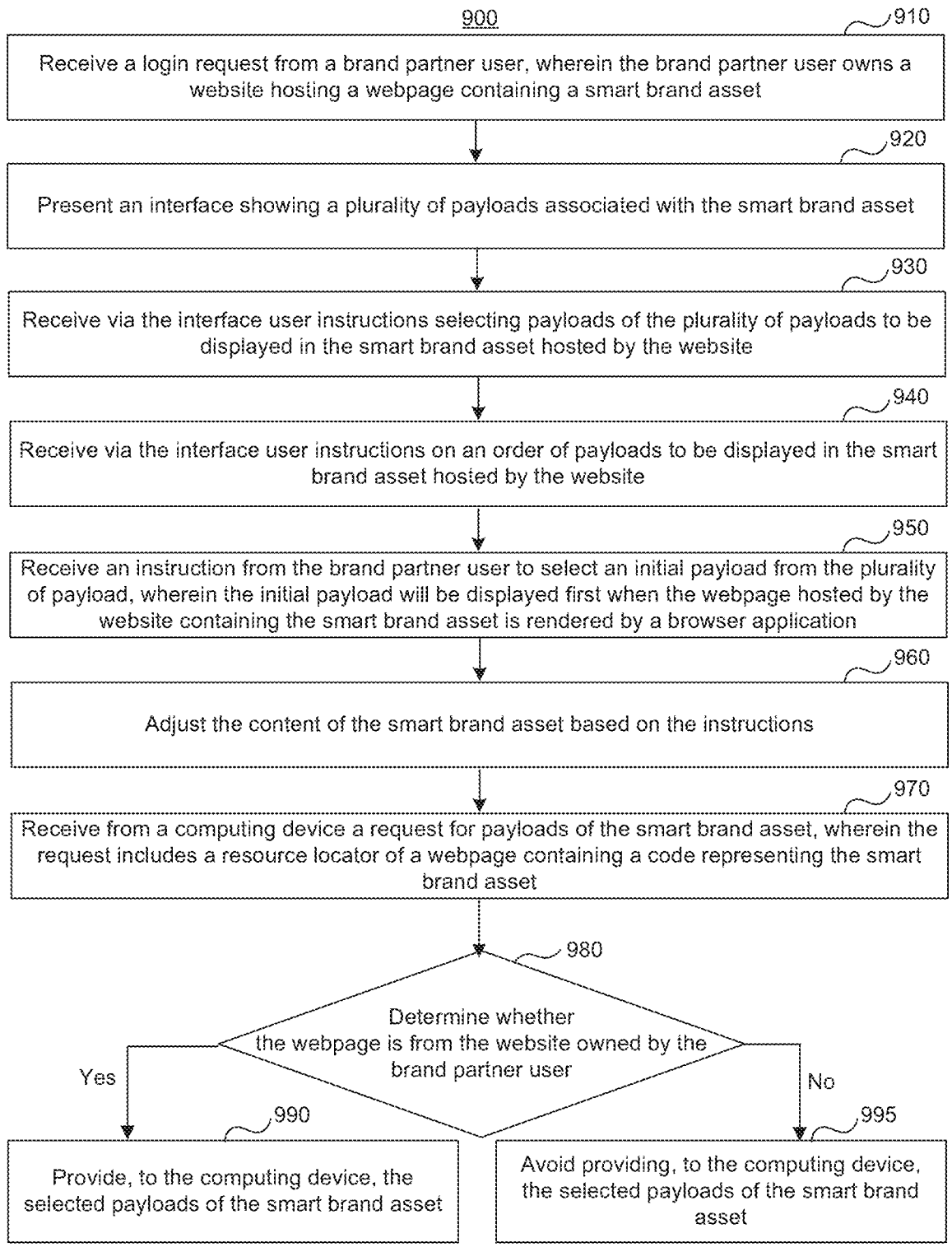
FIG. 9 is an example flow diagram showing a mechanism of filtering payloads for smart brand assets, according to an embodiment of the invention.

FIG. 9 is an example flow diagram showing a mechanism of filtering payloads for smart brand assets, according to an embodiment of the invention. In step 910, the brand asset server receives a login request from a brand partner user, wherein the brand partner user owns a website hosting a webpage containing a smart brand asset. In step 920, after authenticating the brand partner user, the brand asset server presents an interface showing a plurality of payloads associated with the smart brand asset. The plurality of payloads can represent products associated with the smart brand asset. The selected payloads can represent products that the brand partner user selects to present on the website. The plurality of payloads can be stored in a database.

In step 930, the brand asset server receives via the interface user instructions selecting payloads of the plurality of payloads to be displayed in the smart brand asset hosted by the website. In step 940, the brand asset server receives via the interface user instructions on an order of payloads to be displayed in the smart brand asset hosted by the website. In step 950, the brand asset server receives an instruction from the brand partner user to select an initial payload from the plurality of payload, wherein the initial payload will be displayed first when the webpage hosted by the website containing the smart brand asset is rendered by a browser application. The initial payload may be selected by the brand partner user based on audience or need of the website. In step 960, the brand asset server adjusts the content of the smart brand asset based on the instructions.

In step 970, the brand asset server receives from a computing device a request for payloads of the smart brand asset, wherein the request includes a resource locator of a webpage containing a code representing the smart brand asset. In step 980, the brand asset server determines whether the webpage is from the website owned by the brand partner user. If the webpage is from the website owned by the brand partner user, in step 990, the brand asset server provides, to the computing device, the selected payloads of the smart brand asset. If the webpage is not from the website owned by the brand partner user, in step 995, the brand asset server avoids providing, to the computing device, the selected payloads of the smart brand asset.

Assigning Groups of Smart Brand Assets

The brand owner (or brand partner) can assign groups of smart brand assets that carry different payloads. Related business entities can attach themselves to those groups such that they can use those smart brand assets in the attached groups on their websites. A brand owner wants to allow smart brand assets to be used by business partners. However, a business partner's smart brand assets may need to be configured differently from other business partners. As an example, reseller 1 may be selling certain products from the brand owner's company catalog whereas reseller 2 may be selling the products of the entire catalog. In this case the brand owner wants to limit the product feed for reseller 1.

A brand owner or brand partner can define groups for particular smart brand assets where the smart brand asset behaves differently in each group. Brand partners or anonymous administrators who are interested in using the smart brand asset can be directed to the brand owner or brand partner's (also referred to as the sponsor's) website where the smart brand asset will be displayed. The user can select the smart brand asset on the website and input the user's domain name (where the smart brand asset will be hosted) and other data into a form. The sponsor can then receive a notification for the approval request. Once the sponsoring brand owner or partner approves the request, the business partner may embed the code representing smart Brand asset in webpages hosted on his or her website. When the smart brand asset is rendered with the webpage, the brand asset server can check to see if there is a match between the domain name supplied when the user made the request and current domain name where the smart brand asset sits. If there is a match, the smart brand asset can render normally. If there is not, the system will supply an error notice, render a null set (no result), or an alternative result (as defined by the user).

Figure 10:
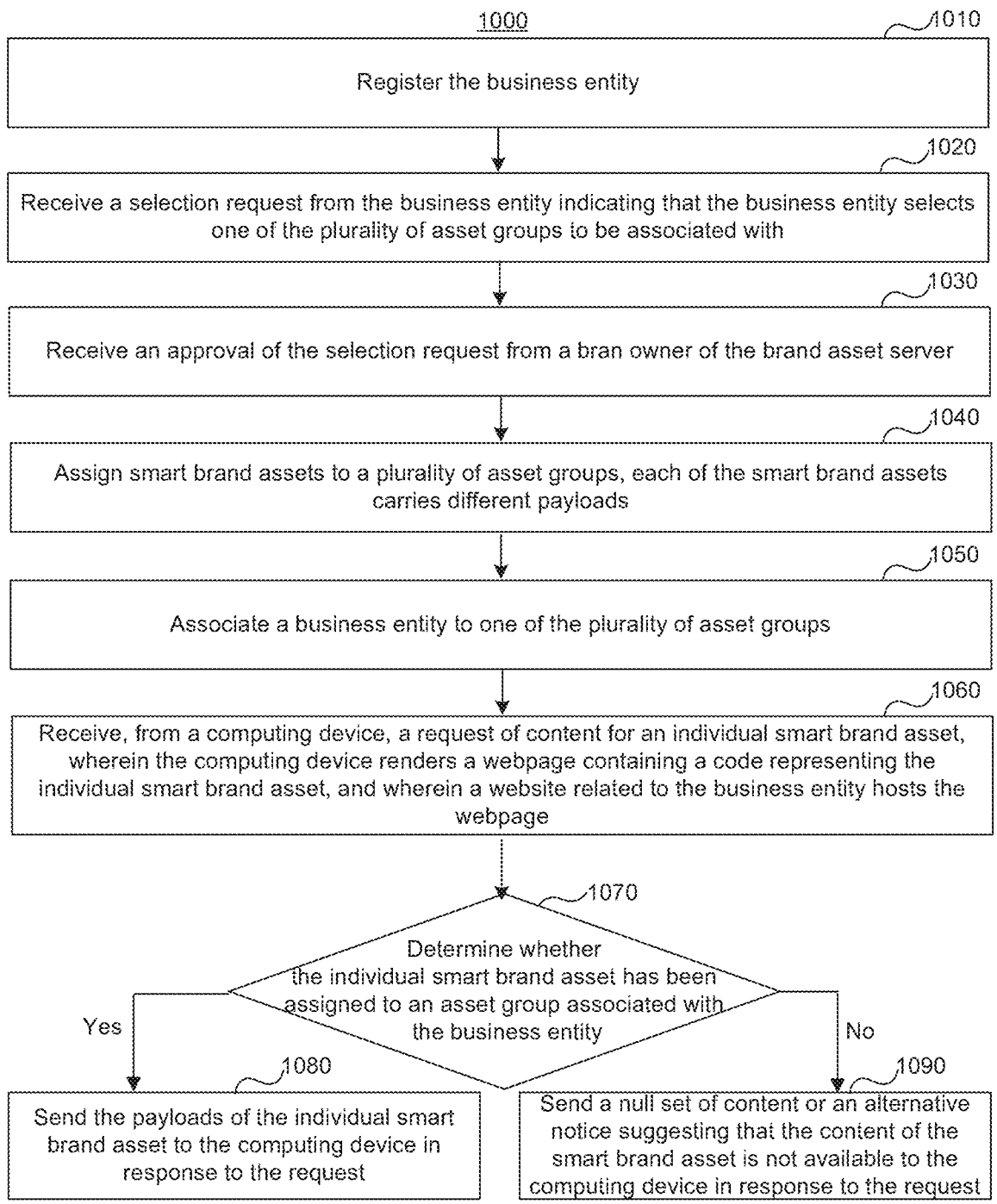
FIG. 10 is an example flow diagram showing a mechanism of filtering payloads for smart brand assets, according to an embodiment of the invention.

FIG. 10 is an example flow diagram showing a mechanism of filtering payloads for smart brand assets, according to an embodiment of the invention. In step 1010, the brand asset server registers the business entity. In step 1020, the brand asset server receives a selection request from the business entity indicating that the business entity selects one of the plurality of asset groups to be associated with. In step 1030, the brand asset server received an approval of the selection request from a brand owner of the brand asset server.

In step 1040, the brand asset server assigns smart brand assets to a plurality of asset groups, each of the smart brand assets carries different payloads. In step 1050, the brand asset server associates a business entity to one of the plurality of asset groups. In step 1060, the brand asset server receives, from a computing device, a request of content for an individual smart brand asset, wherein the computing device renders a webpage containing a code representing the individual smart brand asset, and wherein a website related to the business entity hosts the webpage.

In step 1070, the brand asset server determines whether the individual smart brand asset has been assigned to an asset group associated with the business entity. In step 1080, if the individual smart brand asset has been assigned to an asset group associated with the business entity, the brand asset server sends the payloads of the individual smart brand asset to the computing device in response to the request. In step 1090, if the individual smart brand asset is determined not assigned to any asset group associated with the business entity, the brand asset server sends a null set of content or an alternative notice suggesting that the content of the smart brand asset is not available to the computing device in response to the request.

Bookmarking Slides of Smart Brand Assets

A consumer of a smart brand asset can bookmark a particular slide so that he can come back to at some point. The consumer also wants to come back to the same slide in the smart brand asset where he left off last time.

While viewing a slide in the secondary payload of a smart brand asset, a consumer can choose to bookmark a slide in the smart brand asset. At any point in time, the consumer can choose a bookmark and return to that point in the payload. This can be done, for example, by placing a unique smart brand asset id in the '#!' extension of the URL. The system can also place a cookie noting where that user left off such that when the user returns to the smart brand asset he or she will return to the same slide. Thus, consumers can bookmark slides in a smart brand asset, not just on web pages. This is helpful when consumers wish to create links they want to share with other users that will take them to specific expressions (e.g. slides) of the smart brand asset payloads.

Figure 11:
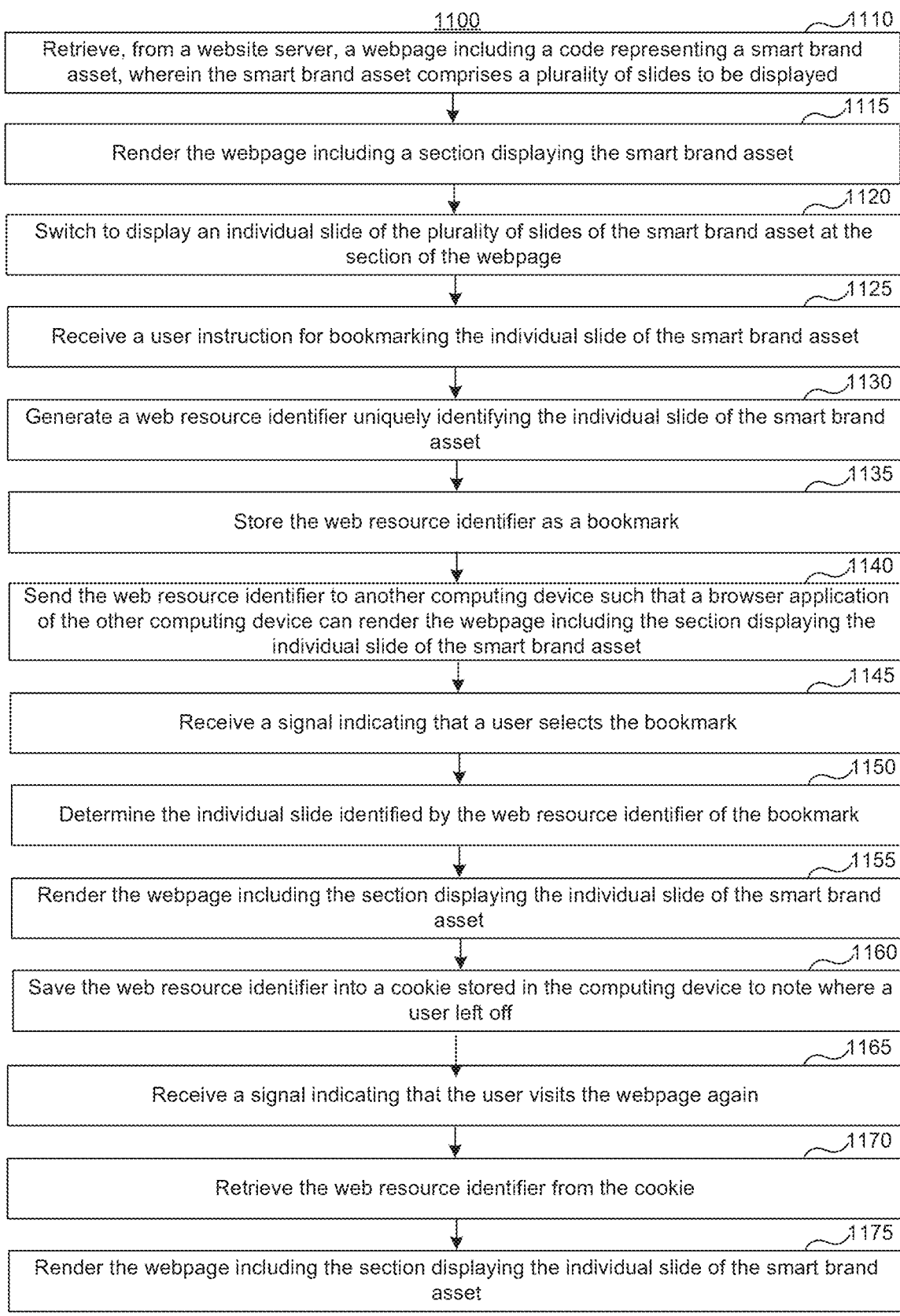
FIG. 11 is an example flow diagram showing a mechanism of bookmarking slides for smart brand assets, according to an embodiment of the invention.

FIG. 11 is an example flow diagram showing a mechanism of bookmarking slides for smart brand assets, according to an embodiment of the invention. In step 1110, a computing device retrieves, from a website server, a webpage including a code representing a smart brand asset, wherein the smart brand asset comprises a plurality of slides to be displayed. In step 1115, the computing device renders the webpage including a section displaying the smart brand asset. In step 1120, the computing device switches to display an individual slide of the plurality of slides of the smart brand asset at the section of the webpage.

In step 1125, the computing device receives a user instruction for bookmarking the individual slide of the smart brand asset. In step 1130, the computing device generates a web resource identifier uniquely identifying the individual slide of the smart brand asset. The web resource identifier can comprise a uniform resource locator (URL) having an extension uniquely identifying the individual slide of the smart brand asset. In step 1135, the computing device stores the web resource identifier as a bookmark. In step 1140, the computing device sends the web resource identifier to another computing device such that a browser application of the other computing device can render the webpage including the section displaying the individual slide of the smart brand asset.

In step 1145, the computing device receives a signal indicating that a user selects the bookmark. In step 1150, the computing device determines the individual slide identified by the web resource identifier of the bookmark. In step 1155, the computing device renders the webpage including the section displaying the individual slide of the smart brand asset.

In step 1160, the computing device saves the web resource identifier into a cookie stored in the computing device to note where a user left off. In step 1165, the computing device receives a signal indicating that the user visits the webpage again. In step 1170, the computing device retrieves the web resource identifier from the cookie. In step 1175, the computing device renders the webpage including the section displaying the individual slide of the smart brand asset.

Exemplary Digital Data Processing Apparatus

Figure 12:
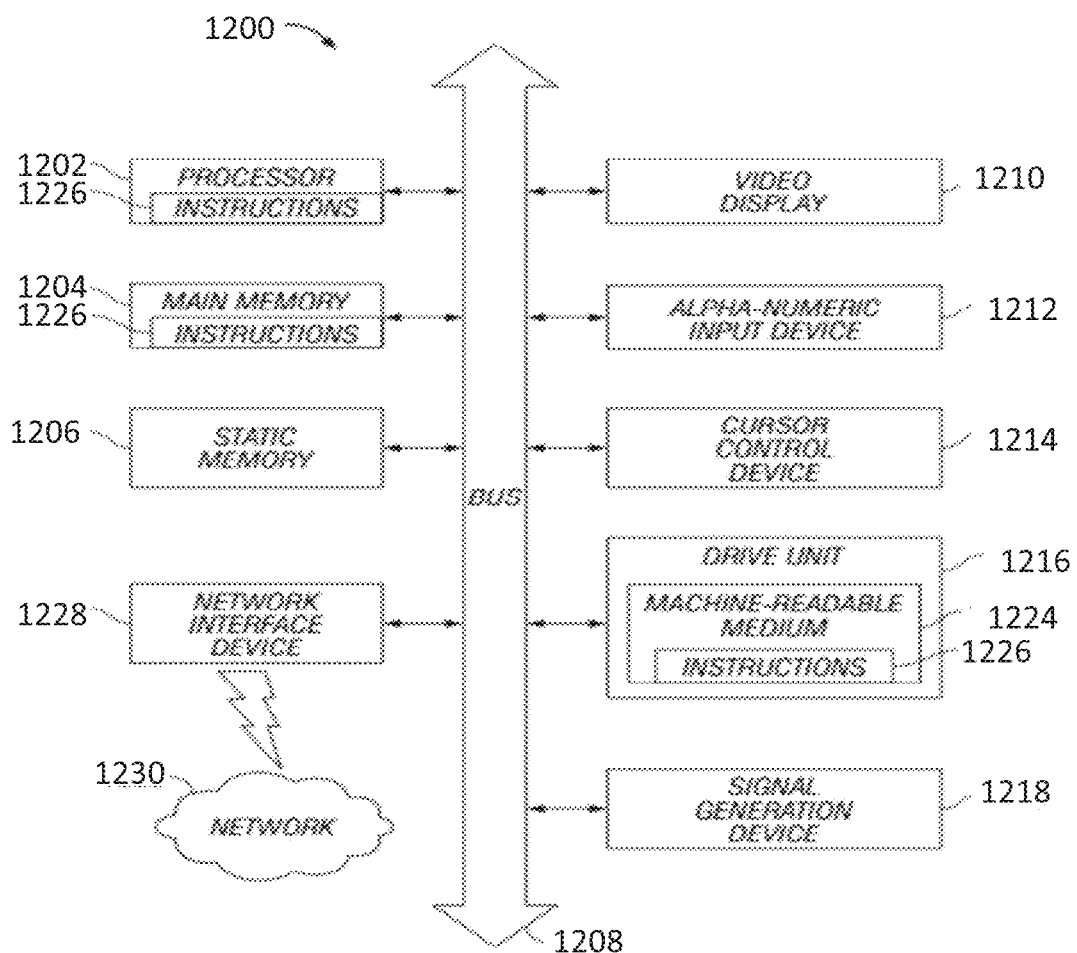
FIG. 12 is a block schematic diagram of a machine, according to an embodiment of the invention.

Embodiments of the invention may be implemented using a digital data processing apparatus. As a specific example, FIG. 12 shows a digital data processing apparatus 1200. The apparatus 1200 includes a processor 1202, such as a microprocessor, personal computer, mobile phone or other mobile personal computing device, workstation, controller, microcontroller, state machine, or other processing machine, coupled to a digital data storage 1204. In the present example, the storage 1204 includes a fast-access storage 1206, as well as nonvolatile storage 1208. The fast-access storage 1206 may be used, for example, to store the programming instructions executed by the processor 1202. The storage 1206 and 1208 may be implemented by various devices. Many alternatives are possible. For instance, one of the components 1206, 1208 may be eliminated; furthermore, the storage 1204, 1206, and/or 1208 may be provided on-board the processor 1202, or even provided externally to the apparatus 1200.

The apparatus 1200 also includes an input/output 1210, such as a connector, line, bus, cable, buffer, electromagnetic link, network, modem, transducer, IR port, antenna, or other means for the processor 1202 to exchange data with other hardware external to the apparatus 1200.

Various instances of digital data storage may be used to embody the storage 1204 and 1208, and for other purposes. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the storage media may be implemented by nearly any mechanism to digitally store machine-readable signals. One example is optical storage such as CD-ROM, WORM, DVD, digital optical tape, disk storage, or other optical storage. Another example is direct access storage, such as a conventional "hard drive," redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Other Embodiments

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Furthermore, although elements of the invention may be described or claimed in the singular, reference to an element in the singular is not intended to mean "one and only one" unless explicitly so stated, but shall mean "one or more." Additionally, ordinarily skilled artisans will recognize that operational sequences must be set forth in some specific order for the purpose of explanation and claiming, but the present invention contemplates various changes beyond such specific order.

We claim:

1. A computer-implemented method for authorizing usage of smart brand assets, the method comprising:
   receiving, at a brand asset server from each of a plurality of website servers, a request for using a smart brand asset in a website hosted by each website server, the smart brand asset including an interactive container that contains a unique embed code dynamically referencing one or more brand assets, the unique embed code when placed on a webpage of the website causing a browser application to execute the unique embed code when the browser application loads the webpage;
   recording, in a data structure stored in the brand asset server, an association between the smart brand asset, the website, and a user account associated with one of the plurality of website servers; and
   executing a script at the brand asset server that is called in response to execution of the unique embed code by a browser application of a computing device when the browser application loads a target webpage hosted by the one of the plurality of website servers, wherein the script, when executed by the brand asset server, causes the brand asset server to:
      process a request for payloads of the smart brand asset for display on the target webpage;
      select a subset of the one or more brand assets associated with the smart brand asset based at least in part on the recorded association between the smart brand asset, the website, and the user account associated with the one of the plurality of website servers hosting the target webpage; and
      provide, to the computing device, the selected subset of the one or more brand assets to fulfill the request for the payloads of the smart brand asset.

2. The method of claim 1, further comprising:
   presenting a form requesting authentication information including unique certification, account identification, or password related to the website.

3. The method of claim 1, wherein the website belongs to a business partner affiliate to a brand owner of the smart brand asset, and wherein the payloads of the smart brand asset are determined by the brand asset server based on a business relationship between the business partner and the brand owner.

4. The method of claim 1, wherein said providing comprises:
   providing no payloads to the computing device when the website belongs to an entity which is not currently affiliated to a brand owner of the smart brand asset.

5. A non-transitory computer readable storage medium storing executable instructions, the instructions when executed by one or more processors causing the one or more processors to:
   receive, from each of a plurality of website servers, a request for using a smart brand asset in a website hosted by each website server, the smart brand asset including an interactive container that contains a unique embed code dynamically referencing one or more brand assets, the unique embed code when placed on a webpage of the website causing a browser application to execute the unique embed code when the browser application loads the webpage;
   record, in a data structure stored in the non-transitory computer readable storage medium, an association between the smart brand asset, the website, and a user account associated with one of the plurality of website servers; and
   execute a script that is called in response to execution of the unique embed code by a browser application of a computing device when the browser application loads a target webpage hosted by the one of the plurality of website servers, wherein the script, when executed by the one or more processors, causes the one or more processors to:
      process a request for payloads of the smart brand asset for display on the target webpage,
      select a subset of the one or more brand assets associated with the smart brand asset based at least in part on the recorded association between the smart brand asset, the website, and the user account associated with the one of the plurality of website servers hosting the target webpage; and
      provide, to the computing device, the selected subset of the one or more brand assets to fulfill the request for the payloads of the smart brand asset.

6. The non-transitory computer readable storage medium of claim 5, wherein the instructions when executed further cause the one or more processors to:
   present a form requesting authentication information including unique certification, account identification, or password related to the website.

7. The non-transitory computer readable storage medium of claim 5, wherein the website belongs to a business partner affiliate to a brand owner of the smart brand asset, and wherein the payloads of the smart brand asset are determined based on a business relationship between the business partner and the brand owner.

8. The non-transitory computer readable storage medium of claim 5, wherein said providing comprises:
   providing no payloads to the computing device when the website belongs to an entity which is not currently affiliated to a brand owner of the smart brand asset.

9. A system comprising:
   one or more processors; and
   a non-transitory computer readable storage medium storing executable instructions, the instructions when executed by one or more processors causing the one or more processors to:
      receive, from each of a plurality of website servers, a request for using a smart brand asset in a website hosted by each website server, the smart brand asset including an interactive container that contains a unique embed code dynamically referencing one or more brand assets, the unique embed code when placed on a webpage of the website causing a browser application to execute the unique embed code when the browser application loads the webpage;

record, in a data structure stored in the non-transitory computer readable storage medium, an association between the smart brand asset, the website, and a user account associated with one of the plurality of website servers; and execute a script that is called in response to execution of the unique embed code by a browser application of a computing device when the browser application loads a target webpage hosted by the one of the plurality of website servers, wherein the script, when executed by the one or more processors, causes the one or more processors to:

process a request for payloads of the smart brand asset for display on the target webpage, select a subset of the one or more brand assets associated with the smart brand asset based at least in part on the recorded association between the smart brand asset, the website, and the user account associated with the one of the plurality of website servers hosting the target webpage; and provide, to the computing device, the selected subset of the one or more brand assets to fulfill the request for the payloads of the smart brand asset.

10. The system of claim 9, wherein the instructions when executed further cause the one or more processors to:

present a form requesting authentication information including unique certification, account identification, or password related to the website.

11. The system of claim 9, wherein the website belongs to a business partner affiliate to a brand owner of the smart brand asset, and wherein the payloads of the smart brand asset are determined based on a business relationship between the business partner and the brand owner.

12. The system of claim 9, wherein said providing comprises:

providing no payloads to the computing device when the website belongs to an entity which is not currently affiliated to a brand owner of the smart brand asset.

* * * * *